United States Patent
Mikuriya et al.

(10) Patent No.: US 10,053,363 B2
(45) Date of Patent: Aug. 21, 2018

(54) SYSTEM AND METHOD FOR PRODUCING HYDROGEN

(71) Applicant: CHIYODA CORPORATION, Yokohama-shi, Kanagawa (JP)

(72) Inventors: Tomoyuki Mikuriya, Yokohama (JP); Kenichi Imagawa, Yokohama (JP); Hironori Kawai, Yokohama (JP); Yusuke Nakajima, Yokohama (JP); Takenori Kanda, Yokohama (JP)

(73) Assignee: CHIYODA CORPORATION, Kanagawa (JP)

(*) Notice: Subject to any disclaimer, the term of this patent is extended or adjusted under 35 U.S.C. 154(b) by 116 days.

(21) Appl. No.: 15/124,725

(22) PCT Filed: Mar. 6, 2015

(86) PCT No.: PCT/JP2015/001241
§ 371 (c)(1),
(2) Date: Sep. 9, 2016

(87) PCT Pub. No.: WO2015/136904
PCT Pub. Date: Sep. 17, 2015

(65) Prior Publication Data
US 2017/0015553 A1    Jan. 19, 2017

(30) Foreign Application Priority Data

Mar. 10, 2014    (JP) .................. 2014-046323

(51) Int. Cl.
C01B 3/26    (2006.01)
C01B 3/22    (2006.01)
B01J 7/00    (2006.01)

(52) U.S. Cl.
CPC .................. *C01B 3/26* (2013.01); *B01J 7/00* (2013.01); *C01B 3/22* (2013.01);
(Continued)

(58) Field of Classification Search
CPC .................. C01B 3/22–3/26; C01B 2203/0277–2203/1623; B01J 7/00
See application file for complete search history.

(56) References Cited

FOREIGN PATENT DOCUMENTS

| CN | 103380077 A | 10/2013 |
|---|---|---|
| JP | 2004224596 A | 8/2004 |

(Continued)

OTHER PUBLICATIONS

Extended European Search Report for Application No. 15761874.5, dated Aug. 2, 2017, 7 pages.
(Continued)

*Primary Examiner* — Colleen P Dunn
(74) *Attorney, Agent, or Firm* — Armstrong Teasdale, LLP

(57) ABSTRACT

To allow hydrogen to be supplied to a dehydrogenation reaction unit for dehydrogenating an organic hydride by using a highly simple structure so that the activity of the dehydrogenation catalyst of the dehydrogenation reaction unit is prevented from being rapidly reduced. The hydrogen production system (1) comprises a first dehydrogenation reaction unit (3) for producing hydrogen by a dehydrogenation reaction of an organic hydride in presence of a first catalyst, and a second dehydrogenation reaction unit (4) for receiving a product of the first dehydrogenation reaction unit, and producing hydrogen by a dehydrogenation reaction of the organic hydride remaining in the product in presence of a second catalyst, wherein an amount of the first catalyst used in the first dehydrogenation reaction unit is equal to or less than an amount of the second catalyst used in the second dehydrogenation reaction unit, and an amount of hydrogen produced in the first dehydrogenation reaction unit is less than an amount of hydrogen produced in the second dehydrogenation reaction unit.

5 Claims, 4 Drawing Sheets

(52) U.S. Cl.
CPC ............... *C01B 2203/0277* (2013.01); *C01B 2203/0833* (2013.01); *C01B 2203/1047* (2013.01); *C01B 2203/1082* (2013.01); *C01B 2203/1211* (2013.01); *C01B 2203/1252* (2013.01); *C01B 2203/142* (2013.01); *C01B 2203/16* (2013.01); *C01B 2203/1623* (2013.01)

(56) References Cited

FOREIGN PATENT DOCUMENTS

| | | | |
|---|---|---|---|
| JP | 2005022939 A | 1/2005 |
| JP | 2006104000 A | 4/2006 |
| JP | 2010006652 A | 1/2010 |
| JP | 2011140411 A | 7/2011 |
| JP | 2011195418 A | 10/2011 |

OTHER PUBLICATIONS

International Search Report for International Application No. PCT/JP2015/001241, dated Jun. 2, 2015, 4 pages.

first dehydrogenation reaction unit second dehydrogenation reaction unit (A)

(B)

SYSTEM AND METHOD FOR PRODUCING HYDROGEN

TECHNICAL FIELD

The present invention relates to a system and a method for producing hydrogen by dehydrogenation of an organic hydride, and in particular to a system and a method for producing hydrogen that is suitable for use in an organic chemical hydride process for storing and transporting hydrogen in the form of an organic hydride obtained by hydrogenating an aromatic compound.

BACKGROUND ART

The organic chemical hydride process for hydrogenating aromatic compounds such as toluene has recently been developed for the purposes of storing and transporting hydrogen in the form of organic hydrides (hydrogenated aromatic compound). According to this process, hydrogen is converted into an organic hydride at the site of production of hydrogen, and transported in the form of the organic hydride. The organic hydride is separated into the hydrogen and the aromatic compound at a plant or a hydrogen station located near a city or other user of hydrogen by dehydrogenating the organic hydride. The aromatic compound produced from this dehydrogenation process is transported back to the production site of hydrogen to be hydrogenated by hydrogen once again.

It is known that the catalyst used for the dehydrogenation process is degraded over time by carbon originating from a poisoning substance (such as biphenyl produced at the time of hydrogenating the aromatic compound) which is deposited on the surface of the dehydrogenation catalyst (by carbonation), and this may significantly limit the activity (or the service life) of the catalyst.

It is also known to control the reduction in catalyst activity by preventing the deposition of carbon on the dehydrogenation catalyst by circulating a part of the hydrogen that is produced in the dehydrogenation reaction unit by the dehydrogenation reaction of an organic hydride (or by circulating externally supplied hydrogen in the catalyst layer) (See Patent Documents 1 and 2). Such prior art does not require an external source of hydrogen, and eliminates the need for adjusting the purity of the hydrogen when the hydrogen is supplied from an external source.

PRIOR ART DOCUMENT(S)

Patent Document(s)

Patent Document 1: JP2010-006652A
Patent Document 2: JP2011-195418A,

The inventors have discovered that the dehydrogenation reaction progresses excessively rapidly in the inlet region (the reactant supply inlet) of the dehydrogenation reaction unit where no hydrogen exists (or the hydrogen concentration is relatively low) in the conventional dehydrogenation reaction which does not involve the introduction of hydrogen into the dehydrogenation reaction unit with the reactant (material) so that the activity of the dehydrogenation catalyst in the inlet region is severely reduced, and this is a major cause of the reduction in the service life of the catalyst.

When the hydrogen produced by the dehydrogenation reaction is circulated to the dehydrogenation reaction unit as was the case with the prior art disclosed in Patent Documents 1 and 2, because the amount of hydrogen that is circulated to the dehydrogenation reaction unit is not stable at the time of start up, the dehydrogenation reaction progresses excessively rapidly in the inlet region of the dehydrogenation reaction unit at the start up or an external hydrogen source is required to control such a rapid reaction. The prior art suffers not only from the problem of requiring special facilities to circulate hydrogen to the dehydrogenation reaction unit but also from the problem of complicating the structure of the dehydrogenation reaction unit.

BRIEF SUMMARY OF THE INVENTION

The present invention was made in view such a problem of the prior art, and has a primary object to provide a system and a method for producing hydrogen that allow hydrogen to be supplied to a dehydrogenation reaction unit for dehydrogenating an organic hydride by using a highly simple structure so that the activity of the dehydrogenation catalyst of the dehydrogenation reaction unit is prevented from being rapidly reduced.

According to a first aspect of the present invention, the present invention provides a system (1) for producing hydrogen by dehydrogenation of an organic hydride, comprising: a first dehydrogenation reaction unit (3) for producing hydrogen by a dehydrogenation reaction of an organic hydride in presence of a first catalyst; and a second dehydrogenation reaction unit (4) for receiving a product of the first dehydrogenation reaction unit, and producing hydrogen by a dehydrogenation reaction of the organic hydride remaining in the product in presence of a second catalyst; wherein an amount of the first catalyst used in the first dehydrogenation reaction unit is equal to or less than an amount of the second catalyst used in the second dehydrogenation reaction unit, and an amount of hydrogen produced in the first dehydrogenation reaction unit is less than an amount of hydrogen produced in the second dehydrogenation reaction unit.

According to the first aspect of the present invention consisting of a hydrogen production system, the amount of the first catalyst in the first dehydrogenation reaction unit (the secondary dehydrogenation reaction unit) is equal to or less than the amount of the second catalyst in the second dehydrogenation reaction unit (the primary dehydrogenation reaction unit), and the product of the first dehydrogenation reaction unit (containing hydrogen) is supplied to the second dehydrogenation reaction unit as the reactant (material) for the purpose of controlling the reduction in the activity of the second catalyst (dehydrogenation catalyst) so that hydrogen can be supplied to the second dehydrogenation reaction unit by using a simple structure.

According to a second aspect of the present invention, in conjunction with the first aspect of the present invention, the first dehydrogenation reaction unit consists of an adiabatic reaction vessel, and the second dehydrogenation reaction unit consists of a heat exchanger type reaction vessel.

In the system for producing hydrogen based on the second aspect of the present invention, because the first dehydrogenation reaction unit (or the secondary dehydrogenation reaction unit) consists of a relatively simple adiabatic reaction vessel, the manufacturing cost can be minimized. By using a heat exchanger type reaction vessel for the second dehydrogenation reaction unit (or the primary dehydrogenation reaction unit), the reaction temperature of the dehydrogenation reaction can be controlled so that the dehydrogenation reaction can be performed in a stable manner.

According to a third aspect of the present invention, in conjunction with the second aspect of the present invention, an outlet temperature of the product of the first dehydrogenation reaction unit is equal to or higher than an inlet temperature of a reactant of the second dehydrogenation reaction unit.

In the system for producing hydrogen based on the third aspect of the present invention, the product (containing hydrogen) of the first dehydrogenation reaction unit can be supplied to the second dehydrogenation reaction unit by using a simple structure that does not require a preheating arrangement.

According to a fourth aspect of the present invention, in conjunction with any one of the first to third aspects of the present invention, an outlet temperature of a product of the second dehydrogenation reaction unit is higher than an inlet temperature of a reactant of the second dehydrogenation reaction unit.

In the system for producing hydrogen based on the fourth aspect of the present invention, the rapid progress of the dehydrogenation reaction in the inlet region (supply inlet for the reactant) of the second dehydrogenation reaction unit can be controlled while the dehydrogenation reaction which is an endothermic reaction can be performed in the second dehydrogenation reaction unit in a stable manner.

According to a fifth aspect of the present invention, in conjunction with any one of the first to fourth aspects of the present invention, a concentration of hydrogen in the product of the first dehydrogenation reaction unit is equal to or greater than 10 vol %.

In the system for producing hydrogen based on the fifth aspect of the present invention, by controlling the concentration of hydrogen in the product of the first dehydrogenation reaction unit to be within an appropriate range, the dehydrogenation reaction in the second dehydrogenation reaction unit (the primary dehydrogenation reaction unit) can be made to progress in a stable manner, and the activity of the dehydrogenation catalyst (second catalyst) therein can be prevented from being undesirably reduced.

According to a sixth aspect of the present invention, the present invention provides a method for producing hydrogen by dehydrogenation of an organic hydride, comprising: a first dehydrogenation reaction step for producing hydrogen by a dehydrogenation reaction of an organic hydride in presence of a first catalyst; and a second dehydrogenation reaction step for receiving a product of the first dehydrogenation reaction unit, and producing hydrogen by a dehydrogenation reaction of the organic hydride remaining in the product in presence of a second catalyst; wherein an amount of the first catalyst used in the first dehydrogenation reaction step is equal to or less than an amount of the second catalyst used in the second dehydrogenation reaction step, and an amount of hydrogen produced in the first dehydrogenation reaction step is less than an amount of hydrogen produced in the second dehydrogenation reaction step.

As discussed above, according to the present invention, hydrogen can be supplied to a dehydrogenation reaction unit for performing a dehydrogenation reaction of an organic hydride to control the reduction in the activity of the dehydrogenation catalyst in the dehydrogenation reaction unit by using a highly simple structure.

DETAILED DESCRIPTION OF THE PREFERRED EMBODIMENT(S)

Preferred embodiments of the present invention are described in the following with reference to the appended drawings.

Figure 1:
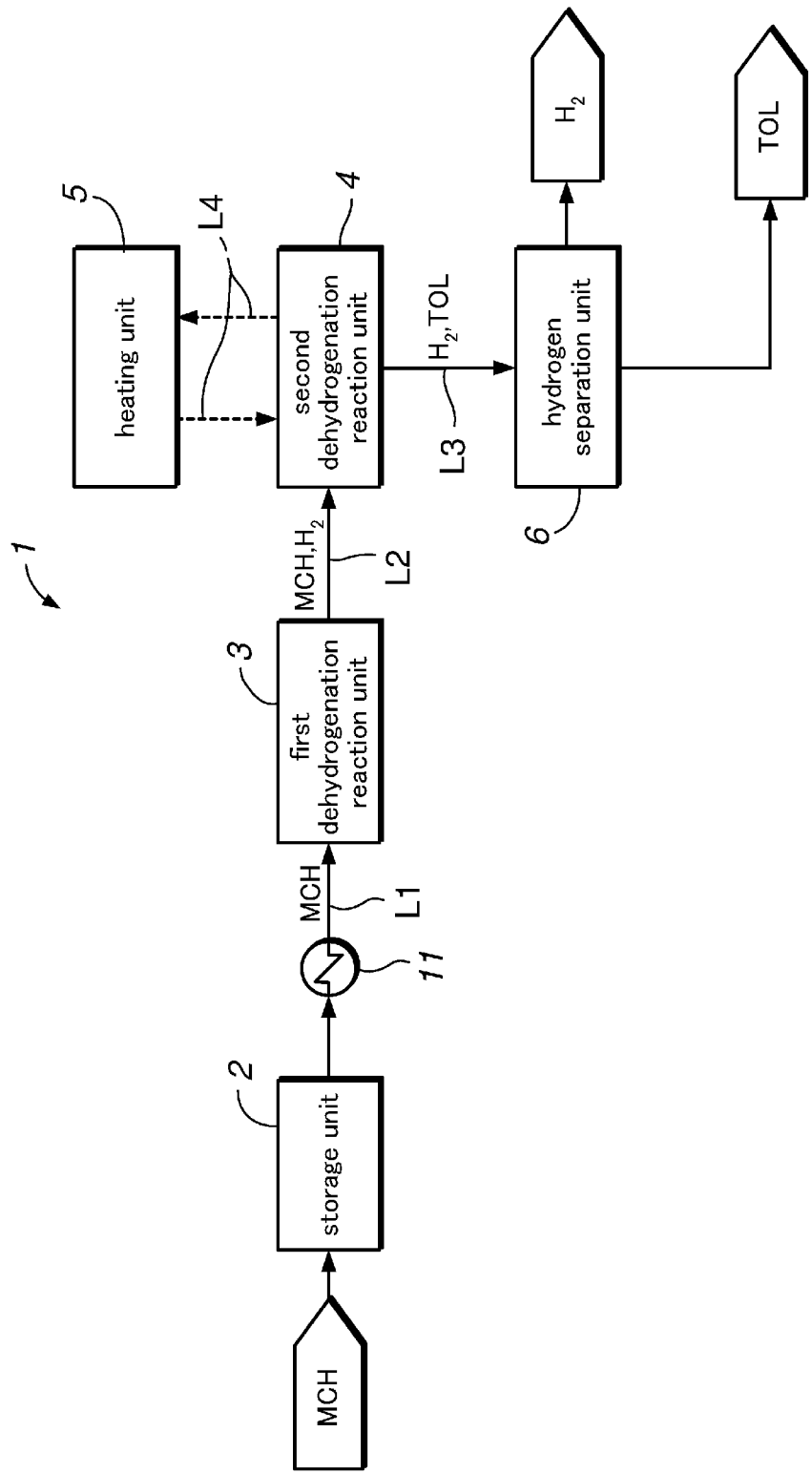
FIG. 1 is a block diagram showing the simplified overall structure of a hydrogen production system embodying the present invention.
Figure 2:
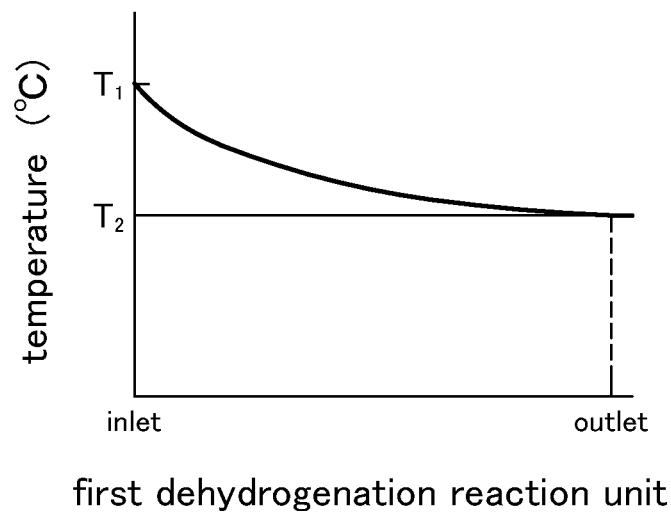
FIG. 2 is a graph showing exemplary changes of the reaction temperature in the first dehydrogenation reaction unit.
Figure 3:
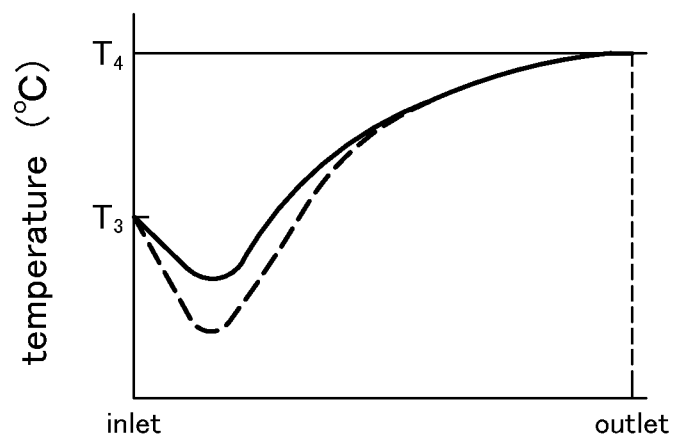
FIG. 3 is a graph showing exemplary changes of the reaction temperature in the second dehydrogenation reaction unit.

FIG. 1 is a block diagram showing the simplified overall structure of a hydrogen production system 1 embodying the present invention, and FIGS. 2 and 3 are graphs showing exemplary changes of the reaction temperatures in the first dehydrogenation reaction unit 3 and the second dehydrogenation reaction unit 4, respectively.

The hydrogen production system 1 is configured to produce hydrogen by dehydrogenating an organic hydride, and comprises, as shown in FIG. 1, a storage unit 2 for storing an organic hydride (MCH: methylcyclohexane in this case) for storage and transportation produced by hydrogenating an aromatic compound (toluene in this case), a first dehydrogenation reaction unit 3 for producing hydrogen by the dehydrogenation reaction of MCH, a second dehydrogenation reaction unit 4 for producing hydrogen by the dehydrogenation reaction of MCH remaining in the product of the first dehydrogenation reaction unit 3, a heating unit 5 for supplying heat used for the dehydrogenation reaction (endothermic reaction) in the second dehydrogenation reaction unit 4 and a hydrogen separation unit 6 for separating hydrogen from toluene in the product of the second dehydrogenation reaction unit 4.

In this hydrogen production system 1, the MCH stored in a storage tank (not shown in the drawings) provided in the storage unit 2 is supplied to the first dehydrogenation reaction unit 3 as a reactant (material) via a first material supply line L1. The first material supply line L1 is provided with a per se known preheater 11 which heats the MCH from the room temperature to a prescribed temperature. In the hydrogen production system 1 of the present invention, the storage unit 2 may be omitted.

In the first dehydrogenation reaction unit 3, hydrogen and toluene (TOL) are produced by the dehydrogenation reaction of the MCH in the presence of a dehydrogenation catalyst (first catalyst) (the first dehydrogenation reaction step). This first dehydrogenation reaction unit 3 is a secondary reaction unit in relation to the second dehydrogenation reaction unit 4 which serves as a primary reaction unit. The purpose of this first dehydrogenation reaction unit 3 is to control the concentration of hydrogen (MCH conversion ratio) in the product (or the reactant that is to be supplied to the second dehydrogenation reaction unit 4) of the first dehydrogenation reaction unit 3 within a prescribed range. Therefore, the amount of hydrogen that is produced by the dehydrogenation reaction in the first dehydrogenation reaction unit 3 is selected to be less than the amount of hydrogen that is produced by the dehydrogenation reaction in the second dehydrogenation reaction unit 4 which will be described hereinafter. The product (containing hydrogen of a prescribed concentration and unreacted MCH) of the first dehydrogenation reaction unit 3 is forwarded to the second dehydrogenation reaction unit 4 via a second material supply line L2.

In the second dehydrogenation reaction unit 4, hydrogen and toluene (TOL) are produced by the dehydrogenation reaction of the MCH (the MCH that remained unreacted in the first dehydrogenation reaction unit 3) in the presence of a dehydrogenation catalyst (second catalyst) (the second dehydrogenation reaction step). In the second dehydrogenation reaction unit 4, the reaction condition is determined such that the reduction in the catalyst activity of the second catalyst is minimized, and the recovery ratio of hydrogen is maximized. The reaction temperature in the second dehydrogenation reaction unit 4 can be controlled by the amount of heat that is supplied from the heating unit 5. The product (containing hydrogen and toluene) of the second dehydrogenation reaction unit 4 is forwarded to the hydrogen separation unit 6 via a product supply line L3.

The hydrogen separation unit 6 consists of a per se known gas-liquid separator, and is configured to separate the product gas containing hydrogen from the liquefied toluene by cooling the product of the second dehydrogenation reaction unit 4 by using a cooling unit not shown in the drawings (hydrogen production step). A per se known adsorption unit or the like may be provided in the downstream end of the hydrogen separation unit 6 for removing the vapor components of the toluene and unreacted MCH remaining in the product gas so that the purity of the produced hydrogen may be improved.

The separated toluene is forwarded to a storage unit not shown in the drawings to be stored therein, and is then circulated to a hydrogenation system not shown in the drawings by per se known transportation means (such as pipelines, trucks and ships). In the hydrogenation system, MCH is recovered by adding hydrogen to the toluene. The recovered MCH can be used in the hydrogen production system 1 once again. The production gas of the second dehydrogenation reaction unit 4 mainly consisting of hydrogen is forwarded to a storage unit (such as high pressure tanks) to be stored therein, and transported to designated hydrogen users as required. The lines L1 to L3 in the hydrogen production system 1 mentioned above without any detailed description thereof may be of per se known structures which may include pipes, valves and pumps not shown in the drawings.

The first dehydrogenation reaction unit 3 consists of an adiabatic fixed bed reactor which does not receive supply of heat from outside, and is provided with a per se known structure including a catalyst reaction vessel lined with heat insulating material and filled with the first catalyst (solid catalyst) although not shown in the drawings. In the catalyst reaction vessel, the reactant (MCH) flows from one side of a catalyst layer to the other. The first catalyst of the first dehydrogenation reaction unit 3 is designed to be replaced more frequently than the second catalyst of the second dehydrogenation reaction unit 4. When the first catalyst is required to be changed, the used solid catalyst is removed from the catalyst reaction vessel, and new solid catalyst is filled into the catalyst reaction vessel.

Cost saving can be achieved by using an adiabatic reactor having a relatively simple structure for the first dehydrogenation reaction unit 3. The dehydrogenation reaction unit 3 may be preferably of a single tube type so that the filling and removing (changing) of the first catalyst may be facilitated. The first dehydrogenation reaction unit 3 is not necessarily required to be using an adiabatic reactor, but is desired to be simpler in structure than the second dehydrogenation reaction unit 4 which will be described hereinafter, and allow the concentration of hydrogen (MCH conversion rate) in the product to be adjusted to be within a prescribed range.

In the first dehydrogenation reaction unit 3, toluene ($C_7H_8$) and hydrogen are produced from MCH ($C_7H_{14}$) by the dehydrogenation reaction of the MCH that can be represented by Chemical Equation (1) given in the following. This dehydrogenation reaction is an endothermic reaction ($\Delta H_{298}$=205 kJ/mol) so that in this chemical equilibrium, the conversion of MCH into toluene and hydrogen is promoted by a high temperature, low pressure condition.

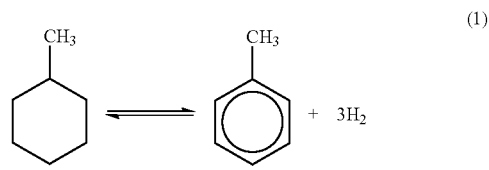

(1)

In the first dehydrogenation reaction unit 3, the inlet temperature (the temperature of the reactant in the supply inlet) T1 of the catalyst reaction vessel is the highest, and the reaction temperature drops as one moves toward the outlet side of the catalyst reaction vessel (or as the endothermic reaction progresses). Therefore, the outlet temperature (the temperature of the product in the outlet) T2 of the catalyst reaction vessel is lower than the inlet temperature T1. In this case, the inlet temperature T1 is 330° C., and the outlet temperature T2 is 260° C. The reaction pressure of the dehydrogenation reaction ranges between 0 MPaG and 1.0 MPaG. The LHSV (liquid hourly space velocity) of MCH depends on the activity level of the catalyst, but may range between 1.0 h$^{-1}$ to 4.0 h$^{-1}$. The dehydrogenation reaction in the first dehydrogenation reaction unit 3 is controlled such that the conversion ratio of the MCH is in the range of 10% to 20%.

The temperature condition of the first dehydrogenation reaction unit 3 may not be limited by the example given above, but may be such that the inlet temperature T1 ranges between 250° C. and 380° C., or more preferably between 280° C. and 350° C., and the outlet temperature T2 may range between 200° C. and 300° C., or more preferably between 240° C. and 280° C. By controlling the inlet temperature T1 and the outlet temperature T2 to be within such ranges, the hydrogen concentration in the product of the first dehydrogenation reaction unit 3 can be raised to the necessary level in a stable manner. As a result, the dehydrogenation reaction in the inlet region of the second dehydrogenation reaction unit 4 can be performed under a more moderate reaction condition.

The lower limit of the hydrogen concentration in the product of the first dehydrogenation reaction unit 3 is 10 vol % or more preferably 20 vol %. By setting the hydrogen concentration in the product of the first dehydrogenation reaction unit 3 to be equal to or more than 10 vol %, the rapid progress of the dehydrogenation reaction in the inlet region of the second dehydrogenation reaction unit 4 can be controlled in a stable manner as will be described hereinafter. Preferably, the upper limit of the hydrogen concentration in the product is about 30 vol %. By setting the hydrogen concentration in the product to be equal to or less than 30 vol %, a small reaction unit can be used for the first dehydrogenation reaction unit 3 so that the space requirements for the first dehydrogenation reaction unit 3 can be minimized.

The organic hydride serving as the reactant for the dehydrogenation reaction in the hydrogen production system 1 is not limited to MCH, but may consist of a monocyclic hydrogenated aromatic compound such as cyclohexane, a bicyclic hydrogenated aromatic compound such as tetralin, decaline and methyldecaline, a tricyclic hydrogenated aromatic compound such as tetradecahydroanthracene, or a combination of two or more of such hydrogenated aromatic compounds. Such organic hydrides should be selected from those that are stable liquid under a normal pressure and temperature for the convenience of transportation and storage.

The aromatic compound that may be produced with hydrogen is not limited to toluene, but, depending on the particular selection of the organic hydride, may consist of a monocyclic aromatic compound such as benzene and xylene, a bicyclic aromatic compound such as naphthalene, tetralin and methylnaphthalene, a tricyclic aromatic compound such as anthracene, or a combination of two or more of such aromatic compounds.

The first catalyst may consist of at least one of active metals selected from a group consisting of nickel (Ni), platinum (Pt), palladium (Pd), rhodium (Rh), iridium (Ir) and ruthenium (Ru) carried by a carrier selected from a group consisting of alumina, silica-alumina and silica, but may also consist of any other per se known catalyst used for dehydrogenating an organic hydride.

The second dehydrogenation reaction unit 4 may consist of a fixed bed, multi-tube reactor of a heat exchanger type, and may have a per se known structure including a plurality of reaction tubes filled with the second catalyst (solid catalyst) and received in a shell. The reactant (or the product of the first dehydrogenation reaction unit 3) which is supplied to each reaction tube of the second dehydrogenation reaction unit 4 flows through the tube while contacting the catalyst. The second catalyst may consist of similar material as the first catalyst, but may also differ from the first catalyst.

Hydrogen and toluene are produced in the second dehydrogenation reaction unit 4 by the dehydrogenation (endothermic reaction) of the MCH according to Chemical Equation (1), and heat is supplied to the second dehydrogenation reaction unit 4 from outside for the purpose of increasing the conversion efficiency of MCH (or avoiding the decrease in the conversion ratio of MCH owing to the lowering of the reaction temperature). The shell of the fixed bed, multi-tube reactor is provided with a heating jacket containing a heat medium (oil in this case) of a high temperature (400° C.) supplied from the heating unit 5 via the heat transportation line L4 circulating therein. The heat medium which is cooled in the heating jacket is forwarded to the heating unit 5 via the heat transportation line L4 to be heated once again therein, and is then circulated back to the fixed bed, multi-tube reactor. By using a heat exchanger type reactor for the second dehydrogenation reaction unit 4, the reaction temperature of the dehydrogenation reaction can be controlled so that the dehydrogenation reaction can be performed in a stable manner.

In the region near the inlet of the second dehydrogenation reaction unit 4, the temperature temporarily drops from the inlet temperature (the temperature of the reactant at the supply inlet) T3 of the reaction tube as one moves outward as indicated by the solid line in FIG. 3, and the reaction temperature rises once again as one moves further outward toward the outlet end of the reaction tube owing to the supply of heat from the heating unit 5. The outlet temperature (the temperature of the product at the outlet end) T4 of the reaction tube is higher than the inlet temperature T3. In this case, the inlet temperature T3 is 260° C., and the outlet temperature is 380° C. However, the inlet temperature T3 may range between 200° C. and 350° C., or more preferably between 250° C. and 330° C., and the outlet temperature T4 may range between 250° C. and 400° C., or more preferably between 300° C. and 380° C. The reaction pressure of the dehydrogenation reaction ranges between 0 MPaG and 1.0 MPaG. The LHSV (liquid hourly space velocity) depends on the activity level of the catalyst, but may range between 1.0 h$^{-1}$ to 4.0 h$^{-1}$.

In this embodiment that uses MCH for the organic hydride, the hydrogen concentration in the product of the second dehydrogenation reaction unit 4 is about 75 vol %, and the conversion ratio of the MCH is 95% or higher. However, the present invention is not limited to these values, and the dehydrogenation reaction in the second dehydrogenation reaction unit 4 may be controlled such that the hydrogen concentration in the product is in the range of 60 vol % to 75 vol %, and the conversion ratio of the MCH is 60% or higher.

Without regard if MCH is used for the organic hydride, the first dehydrogenation reaction unit 3 is controlled such that the conversion ratio of the MCH is in the range of 5% to 30% or more preferably 10% to 20%, and the second dehydrogenation reaction unit 4 is controlled such that the conversion ratio of the MCH is 60% or higher, or more preferably 80% or higher. By controlling the conversion ratio of the organic hydride in the first and second dehydrogenation reaction unit 3 and 4 within such ranges, the reduction of the activity of the second catalyst can be controlled even more favorably.

The hydrogen production system 1 is configured such that the outlet temperature T2 of the product of the first dehydrogenation reaction unit 3 is higher than the inlet temperature T3 of the reactant of the second dehydrogenation reaction unit 4. Therefore, a preheating arrangement is not required to be provided in the second material supply line L2 for heating the product (containing hydrogen) of the first dehydrogenation reaction unit 3 that is to be introduced into the second dehydrogenation reaction unit 4 so that the product can be introduced into the second dehydrogenation reaction unit 4 as the reactant (material) by using a highly simple structure. In this case, because the outlet temperature T2 of the first dehydrogenation reaction unit 3 changes in dependence on the inlet temperature T1, the inlet temperature T1 may be adjusted such that the temperature of the product that is supplied to the second dehydrogenation reaction unit 4 may be controlled within a prescribed temperature range by taking into account the amount of hydrogen (the hydrogen concentration in the product) that is produced as discussed earlier and the lowering of the temperature owing to the dehydrogenation reaction (including the drop in temperature in the second material supply line L2 to be more precise).

For instance, when no hydrogen is supplied to the second dehydrogenation reaction unit 4 (or when the first dehydrogenation reaction unit 3 is omitted) as indicated by the broken line in FIG. 3, owing to the sharp drop in the reaction temperature near the inlet of the second dehydrogenation reaction unit 4 (by the rapid progress of the dehydrogenation reaction), the activity level of the second catalyst near the inlet drops sharply, and this causes an overall reduction in the activity level of the second catalyst. The sharp reduction in the catalyst activity level progressively propagates toward the outlet side, and the activity of the entire catalyst is eventually reduced to an unacceptable level.

The weight ratio of the first catalyst of the first dehydrogenation reaction unit 3 to the second catalyst of the second dehydrogenation reaction unit 4 is in the range of 1:2 to 1:15, more preferably 1:3 to 1:10, or most preferably 1:4 to 1:8. By appropriately selecting the weight ratio of the first catalyst to the second catalyst, the increase in the initial cost and the running cost that may be caused by the introduction of the first dehydrogenation reaction unit 3 can be minimized, and hydrogen can be supplied to the second dehydrogenation reaction unit 4 by using a simple structure. The amounts of the dehydrogenation catalysts that are used in the first and second dehydrogenation reaction units 3 and 4 are not limited by the weight ratios mentioned above, but may be freely determined as long as the amount (weight) of the first catalyst of the first dehydrogenation reaction unit 3 is equal to or less than the amount (weight) of the second catalyst of the second dehydrogenation reaction unit 4.

The hydrogen production system 1 is provided with the first dehydrogenation reaction unit 3 which uses the amount of catalyst equal to or less than that of the second dehydrogenation reaction unit 4 and produces a smaller amount of hydrogen than the second dehydrogenation reaction unit 4, and is configured to supply the product (containing hydrogen) of the first dehydrogenation reaction unit 3 to the second dehydrogenation reaction unit 4 as the reactant (material) thereof, so that the reduction in the activity of the second catalyst of the second dehydrogenation reaction unit 4 can be minimized, and hydrogen can be supplied to the second dehydrogenation reaction unit 4 by using a highly simple structure. In particular, by adjusting the hydrogen content in the product of the first dehydrogenation reaction unit 3 to be within an appropriate range, the dehydrogenation reaction in the primary dehydrogenation reaction unit is allowed to progress in a stable manner, and the reduction in the catalyst activity of the dehydrogenation catalyst (second catalyst) can be minimized.

By controlling the profile of the reaction temperature between the inlet and outlet of the second dehydrogenation reaction unit 4 as indicated by the solid line in FIG. 3, the rapid progress of the dehydrogenation reaction near the inlet can be positively avoided, and the dehydrogenation reaction can be performed in a stable manner over the entire part of the second dehydrogenation reaction unit 4. The controlling of the temperature profile of the second dehydrogenation reaction unit 4 in this manner is beneficial without regards to the changes in the hydrogen concentration. In particular, by arranging a plurality of heating jackets mentioned above from the inlet to the outlet of the second dehydrogenation reaction unit 4, the reaction temperature profile can be controlled even more precisely.

For the details of the organic chemical hydride method, reference may be made to "Development of Dehydrogenation Catalyst for Organic Chemical Hydride Method" by Yoshimi OKADA, et al., *Catalysts & Catalysis*, 2004, 46 (6), p 510-512, ISSN 05598958, "Dehydrogenation Catalyst Development for Organic Chemical Hydride Method and Hydrogen Energy Chain Vision", by Yoshimi OKADA, et al., *Catalysts & Catalysis*, 2009, 51 (6), p 496-498, ISSN 05598958, "Development of Dehydrogenation Catalyst for Organic Chemical Hydride Method with the Aim to Establish a Mass, Long-Distance Storage and Transportation Technology of Hydrogen Energy" by Yoshimi OKADA, et al., *Chemical Engineering*, 2010, 74 (9), p 468-4'70, ISSN 03759253, and "Development of Dehydrogenation Catalyst for Organic Chemical Hydride Method in Hydrogen Storage and Transportation (New Year Special Edition, GCS Symposium 2005)", by Yoshimi OKADA, et al., *Fine Chemical*, 2006, 35 (1), p 5-13, ISSN 09136150 in lieu of a detailed discussion in this application.

Figure 4:
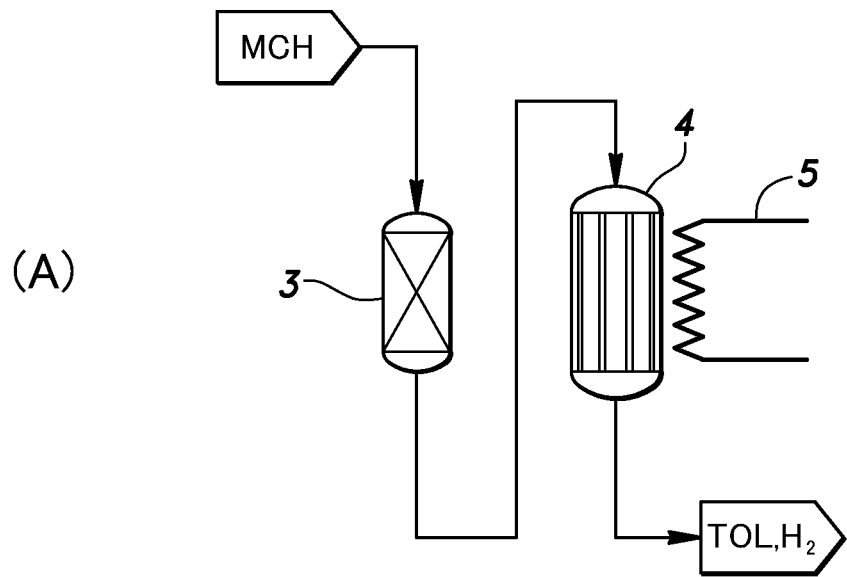
FIG. 4 is a schematic diagram showing examples of the structure of the dehydrogenation reaction unit in the hydrogen production system.
Figure 4:
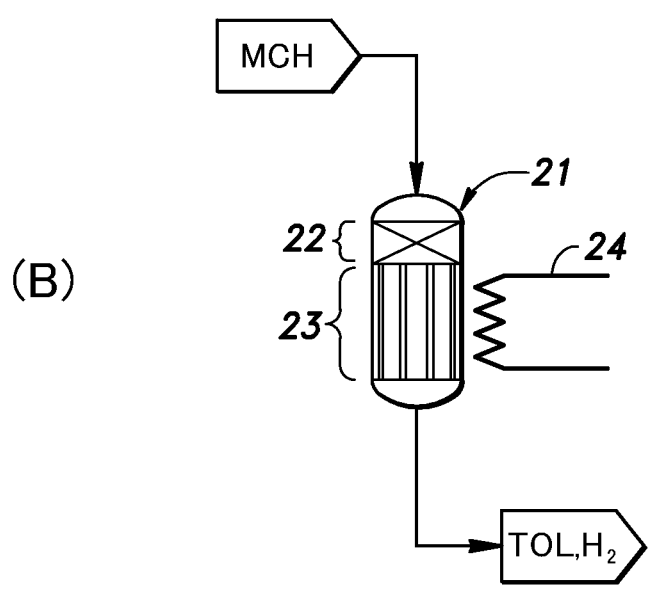

FIG. 4 shows schematic diagrams of exemplary dehydrogenation reaction units that can be used in the hydrogen production system 1. The foregoing description was directed to the example where the first and second dehydrogenation reaction units 3 and 4 are individually provided as shown in FIG. 4(A), but it is also possible to use a single dehydrogenation reaction unit 21 which can perform the functions of the first and second dehydrogenation reaction units 3 and 4 as shown in FIG. 4(B).

As shown in FIG. 4(B), the dehydrogenation reaction unit 21 includes a pre-reactor 22 provided on the inlet side which consists of an adiabatic, fixed-bed reactor similar to the first dehydrogenation reaction unit 3 and a post-reactor 23 provided on the outlet side which consists of a fixed bed, multi-tube reactor of a heat exchanger type similar to the second dehydrogenation reaction unit 4. The post-reactor 23 is provided with a heating unit 24 similar to the heating unit 5 so that the reaction temperature of the post-reactor 23 may be appropriately controlled.

In the dehydrogenation reaction unit 21, MCH is supplied to the pre-reactor 22, and after being adjusted of the hydrogen concentration therein, is introduced into the post-reactor 23. Owing to this arrangement, the dehydrogenation reaction unit 21 can perform the dehydrogenation reaction in a similar manner as the example using the first and second dehydrogenation reaction units 3 and 4 as shown in FIG. 4(A). The pre-reactor 22 is not required to be an adiabatic reactor, but may be provided with a heating unit so that the reaction temperature may be controlled in a manner different from the post-reactor 23. The foregoing embodiments used two dehydrogenation reaction units, but three or more dehydrogenation reaction units may also be used so that the reduction of the activity level of the dehydrogenation reaction catalyst used in the dehydrogenation reaction units of the succeeding stages (the second and the stage(s) subsequent thereto) may be controlled.

The present invention has been described in terms of the concrete embodiments thereof which were given only as examples, and should not be interpreted as limiting the present invention. The various components of the hydrogen production system and the hydrogen production method according to the present invention discussed above can be partly substituted and omitted without departing from the spirit of the present invention. Also, some of the various components of the embodiments discussed above may be combined into a composite unit combining a plurality of functionalities.

List of the Numerals

1 hydrogen production system
2 storage unit
3 first dehydrogenation reaction unit
4 second dehydrogenation reaction unit
5 heating unit
6 hydrogen separation unit
11 preheater
21 dehydrogenation reaction unit
22 pre-reactor (first dehydrogenation reaction unit)
23 post-reactor (second dehydrogenation reaction unit)
24 heating unit

The invention claimed is:
1. A system for producing hydrogen by dehydrogenation of an organic hydride, comprising:

a first dehydrogenation reaction unit for producing hydrogen by a dehydrogenation reaction of an organic hydride in presence of a first catalyst; and a second dehydrogenation reaction unit for receiving a product of the first dehydrogenation reaction unit, and producing hydrogen by a dehydrogenation reaction of the organic hydride remaining in the product in presence of a second catalyst;

wherein an amount of the first catalyst used in the first dehydrogenation reaction unit is equal to or less than an amount of the second catalyst used in the second dehydrogenation reaction unit, and an amount of hydrogen produced in the first dehydrogenation reaction unit is less than an amount of hydrogen produced in the second dehydrogenation reaction unit, and wherein the first dehydrogenation reaction unit consists of an adiabatic reaction vessel, and the second dehydrogenation reaction unit consists of a heat exchanger type reaction vessel.

2. The system for producing hydrogen according to claim 1, wherein an outlet temperature of the product of the first dehydrogenation reaction unit is equal to or higher than an inlet temperature of a reactant of the second dehydrogenation reaction unit.

3. The system for producing hydrogen according to claim 1, wherein an outlet temperature of a product of the second dehydrogenation reaction unit is higher than an inlet temperature of a reactant of the second dehydrogenation reaction unit.

4. The system for producing hydrogen according to claim 1, wherein a concentration of hydrogen in the product of the first dehydrogenation reaction unit is equal to or greater than 10 vol %.

5. A method for producing hydrogen by dehydrogenation of an organic hydride, comprising:

a first dehydrogenation reaction step for producing hydrogen by a dehydrogenation reaction of an organic hydride in presence of a first catalyst; and a second dehydrogenation reaction step for receiving a product of the first dehydrogenation reaction unit, and producing hydrogen by a dehydrogenation reaction of the organic hydride remaining in the product in presence of a second catalyst;

wherein an amount of the first catalyst used in the first dehydrogenation reaction step is equal to or less than an amount of the second catalyst used in the second dehydrogenation reaction step, and an amount of hydrogen produced in the first dehydrogenation reaction step is less than an amount of hydrogen produced in the second dehydrogenation reaction step, and wherein the first dehydrogenation step is performed in an adiabatic reaction vessel, and the second dehydrogenation step is performed in a heat exchanger type reaction vessel.

* * * * *